United States Patent [19]

Bielski et al.

[11] 3,862,887

[45] Jan. 28, 1975

[54] METHOD FOR PROCESSING HEAT-DECOMPOSABLE NON-GASEOUS MATERIALS

[75] Inventors: Edward T. Bielski, Sappington; Daryl L. Lackey, Chesterfield; Russell V. Theiss, St. Louis, all of Mo.

[73] Assignee: Monsanto Enviro-Chem Systems, Inc., Chicago, Ill.

[22] Filed: July 30, 1973

[21] Appl. No.: 383,954

Related U.S. Application Data

[60] Division of Ser. No. 210,655, Dec. 22, 1971, Pat. No. 3,794,565, which is a continuation-in-part of Ser. No. 54,495, July 13, 1970, abandoned.

[52] U.S. Cl............................ 201/2.5, 201/8, 201/25, 201/27
[51] Int. Cl............................................. C10b 51/00
[58] Field of Search............. 201/2.5, 8, 21, 25, 27, 201/32, 34; 48/209, 197 A; 202/117, 100, 99, 131, 136, 216, 218

[56] References Cited
UNITED STATES PATENTS

| | | | |
|---|---|---|---|
| 1,458,410 | 6/1923 | Hiller | 202/100 |
| 1,458,410 | 6/1923 | Hiller | 202/100 |
| 2,813,822 | 11/1957 | Collier | 201/25 |
| 2,927,062 | 3/1960 | Reintjes | 201/25 |
| 3,759,795 | 9/1973 | Oliver et al. | 201/25 |

*Primary Examiner*—Wilbur L. Bascomb, Jr.
*Assistant Examiner*—D. Sanders
*Attorney, Agent, or Firm*—Arthur E. Hoffman; Roger R. Jones

[57] ABSTRACT

Method for treating municipal waste comprised of solid heat-decomposable materials wherein the waste material is heated directly by convection in a rotary kiln and preferably also by radiation from an open flame to effect pyrolysis. A portion of the gaseous pyrolytic decomposition gases produced are burned in situ within the kiln, through the addition of controlled amounts of oxygen, while concurrently substantially maintaining the pyrolyzing waste in a substantially non-oxidizing atmosphere. The waste material is charged at the raised end of the inclined rotary kiln and the open flame projected by a burner at the other end of the kiln is spatially disposed such that the flame is in an unrestricted, spaced relationship with the waste material. The gases move counter-current to the bed of waste material and are withdrawn from the kiln proximate the waste material feed end. Agitation of the bed of pyrolyzing waste material is effected, without significant amounts of the waste material becoming entrained in the moving gases, by a rotary tumbling action coupled with the hot knife and separating action of heat-conductive members which protrude from the shell of the kiln.

In specific embodiments the withdrawn gases may be totally combusted in a separate combustion chamber and then may be scrubbed to remove particulates prior to being discharged to the atmosphere. The hot solid residue may be quenched and subjected to resource recovery separations. In a further embodiment, an aqueous scrubber for the gases and an aqueous quench bath for the hot solid residue may be operated in conjunction with each other to avoid any discharge of water to a sewer.

8 Claims, 4 Drawing Figures

METHOD FOR PROCESSING HEAT-DECOMPOSABLE NON-GASEOUS MATERIALS

This application is a division of copending application Ser. No. 210,655, filed Dec. 22, 1971, now U.S. Pat. No. 3,794,565, which is a continuation-in-part of then copending application Ser. No. 54,495, filed July 13, 1970, now abandoned.

BACKGROUND OF THE INVENTION

1. Field of the Invention

The disposal of liquid and solid wastes constitutes a problem which has received much serious attention in recent years. Not only can disposal of such waste in an improper manner detract from the beauty of our surroundings but improper disposal can also result in pollution of lakes and streams and/or the creation of unsafe and undesirable land areas.

One widely employed method for the disposal of solid wastes comprises the so-called "land-fill" procedure in which the wastes are mixed with a certain amount of dirt and eventually covered over with a layer of top soil. It is now recognized, however, that land-fill procedures as widely employed in many areas are not completely safe and do not produce land areas in many instances which can be put to immediate commercial use. Further, the areas available for land-fill in many sections of the country have largely been depleted.

As an alternative to disposing of wastes by landfill, it has been the practice in some areas to incinerate such wastes in forced air incinerators. Incineration, however, has the disadvantage that it necessitates the handling of large volumes of gases and as generally practiced, normally results in objectionable air pollution. Removal of the pollutants from these gases is difficult and costly due in part to the nature of the combustion products found in these gases, but largely because of the large volume of gases which must be handled.

Because of the disadvantages of land-fill and the like operations and of incinerating liquid or solid wastes, efforts have been made for many years to develop a pyrolysis method and apparatus for treating solid and liquid wastes. Pyrolysis has the theoretical advantage that waste disposal process can be made substantially odor-free, the advantage that there need be substantially no smoke pollution associated with pyrolysis and the advantage that the solid residue can be non-putrifiable and non-pathogenic and additionally can be substantially odor-free.

2. Description of the Prior Art

In spite of the theoretical advantages of pyrolysis as a method for solid and liquid waste disposal, no pyrolysis stream or apparatus has achieved widespread commercial use primarily, it is believed, because of heat transfer problems associated with pyrolysis and the difficulties of obtaining odor-free end products without encountering objectionable slagging in the pyrolysis chamber. If the temperature in the pyrolysis chamber is allowed to rise above a relatively critical upper limit, glass and other inorganic materials may be melted to form a slag which tends to adhere tenaciously to any surface upon which it is permitted to solidify and yet if the decomposition products are not heated to a temperature which may approach the temperature at which slagging is encountered, the products may not be odor-free.

Partially to avoid the problem of slagging, most prior art procedures for pyrolysis have involved indirect heating of the material to be pyrolyzed in a pyrolysis chamber made of a heat conductible material such as stainless steel. By this means the walls of the pyrolysis chamber are heated and conduct heat to the waste materials inside the chamber so that the walls are at all times at least as hot as the waste materials in the pyrolysis chamber and any slag which is formed within the chamber is prevented from solidifying upon the pyrolysis chamber walls. The disadvantages of such apparatus will, however, be readily apparent to those skilled in the art and include heat transfer problems, corrosion problems of a serious nature, and the problem in many instances of handling molten inorganic materials.

SUMMARY OF THE INVENTION

In accordance with applicants' invention, the problems associated with prior art pyrolysis apparatus are overcome by apparatus in which the material to be pyrolyzed is heated by convection by contact with the combustion gases resulting from a burner or the like and preferably are additionally heated by direct radiation from a flame produced by the burner. Provision is also made for the material being treated to be agitated by heat conducting members so that additional heat transfer to the material is obtained by conduction. In accordance with this invention, it has also been found possible in many instances to oxidize part of the decomposition gases as they are formed and this provides additional heat energy for supporting the endothermic pyrolysis reaction. All gases are thereafter removed from the pyrolysis chamber and processed in a flame purifier where the temperature can be raised to a point high enough to insure an odor-free off-gas and where all combustible components of the off-gases can be fully oxidized.

The invention also provides apparatus for handling solid residue from the pyrolysis chamber such that it is rapidly cooled to a suitable temperature for further handling, thus permitting iron components to be removed magnetically if desired and the remaining components, which comprise primarily non-magnetic metals, inorganics, and elemental carbon, to be further processed or discarded. Other advantages and features of the process and apparatus will be apparent from the description of preferred embodiments thereof which follows.

BRIEF DESCRIPTION OF THE DRAWING

The invention will now be described with reference to the accompanying drawings in which.

DESCRIPTION OF THE PREFERRED EMBODIMENTS

Figure 1:
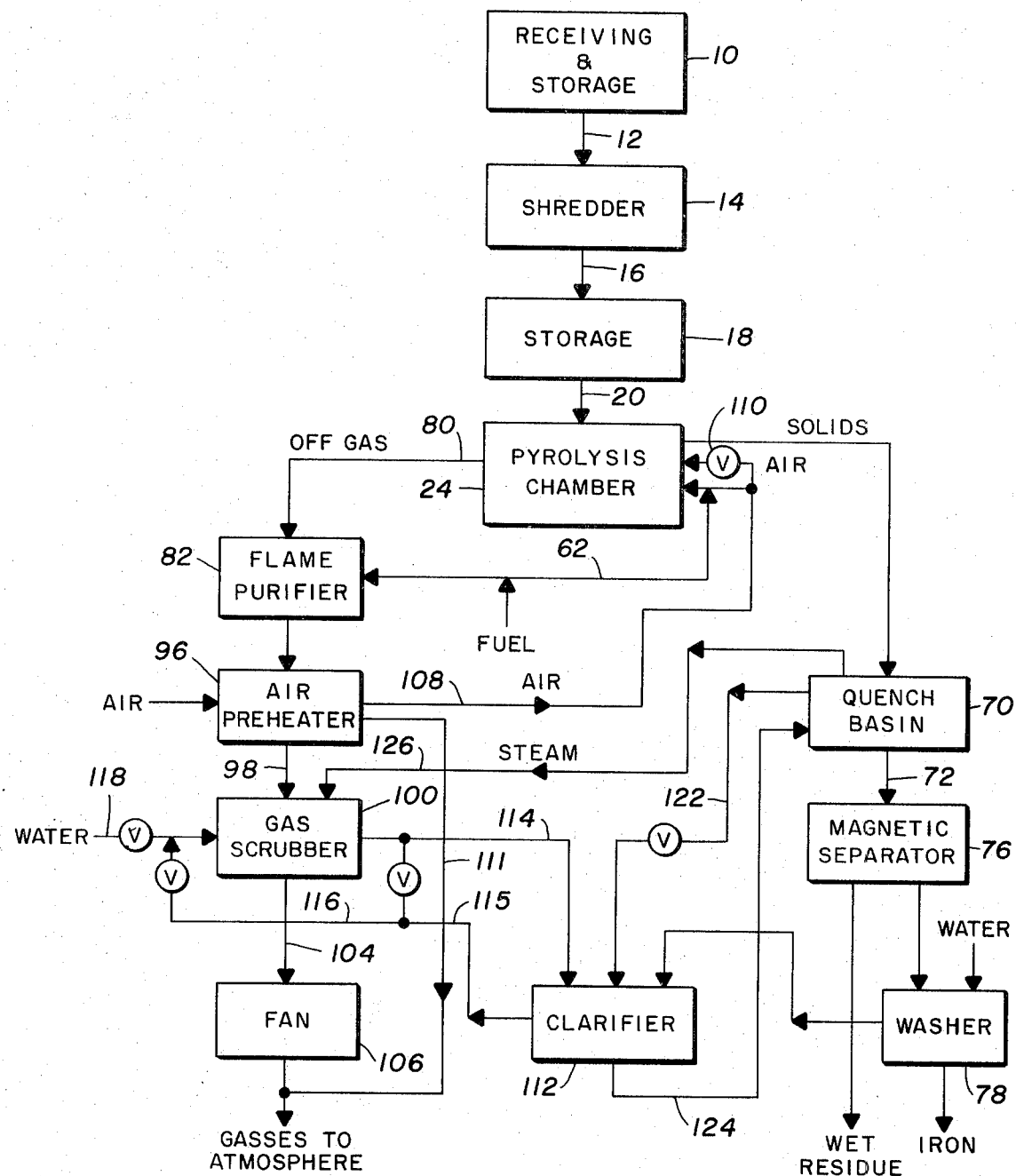
FIG. 1 is a block diagram of pyrolysis apparatus in accordance with this invention designed primarily for the processing of solid heat-decomposable materials with this invention.

With reference to the drawings in greater detail and with particular reference to FIG. 1 thereof, the reference numeral 10 indicates a receiving and storage area or receptacle for receiving solid heat-decomposable materials, such as municipal trash or garbage, to be processed in accordance with this invention. The receiving receptacle or the like can be of conventional design and, for example, can constitute a metal hopper or concrete pit, or plurality thereof, arranged with one rim at or near surface level so that trucks bringing material to the site for processing can be readily unloaded into the hopper or hoppers.

From storage receptacle 10, material to be processed is transported by a conveyor means 12 to a shreder 14. Both conveyor means 12 and shredder 14 can be of conventional design and suitable equipment is readily available upon the open market. For example, conveyor 12 can suitably be a belt conveyor or a drag chain conveyor such as is conventionally employed for transporting materials in a continuous manner and shredder 14 can suitably be a shredder such as is presently employed commercially for the shredding of junked automobile bodies and other solid wastes. The only requirement of shredder 14 is that it divide the solid material into pieces or chunks such that it can readily be handled and economically heated to a pyrolysis temperature. Dividing the solid material into chunks or pieces such that it has a mean particle size (particle size being defined as the maximum dimension of the particle) of not more than about 4 inches to 8 inches is usually satisfactory, although appreciably better results are obtained if the mean particle size is not more than about 2 inches to 3 inches. At the other extreme, the mean particle size should be at least 1/32 inch and is preferably at least ¼ inch.

Shredded solids from shredder 14 are conveyed by any suitable conveyor means 16 to a storage silo 18 which can be of any suitable design and, for example, can constitute a cylindrical bin or a cylindrical bin with a conical bottom. Preferably, the storage silo 18 is provided with conventional means, not illustrated, to insure uniform flow from the silo. Storage silo 18 is advantageously present in the system to insure a constant supply of solids so that the system can be operated on a continous twenty-four hour basis even during periods when delivery of solids to the site of the apparatus is temporarily interrupted.

From storage silo 18, the solid material is conveyed by conventional conveyor means, schematically illustrated at 20 in FIG. 1 of the drawings, to a ram feeder 22 (see FIG. 2 of the drawings) from which it is fed into a rotary pyrolysis chamber generally indicated by the reference numeral 24. Ram feeder 22 will subsequently be described in greater detail.

Pyrolysis chamber 24, in accordance with the preferred illustrated embodiment, generally resembles a conventional rotary kiln, the main body of which comprises a rotary tubular member 26 which is lined with refractory material 28. Tubular member 26 is inclined with respect to the horizontal such that when solids are fed to the upper end of the tubular member 26, rotation thereof in conjunction with the force of gravity causes the solids to move from the upper end of the tubular member 26 and out the lower end thereof. The tubular member 26 may optionally be provided with a generally annular flange 30 to prevent solids fed to the upper end of the member 26 from falling out. To complete the necessary means for moving material through the tubular member 26 and for moving the solid residue out of the lower end thereof, an electric motor 32 and a gear train 34 are provided for operatively rotating the tubular member 26.

The upper end of tubular member 26 extends into a stationary feed hood 36 which serves to prevent the uncontrolled entry of air into and the escape of gases from the pyrolysis chamber. Sliding contact of the hood 36 with the tubular member 26 is made through a seal member 38 which can be conventional in design and which can be formed of any suitable heat resistant material such as, for example, asbestos. Feed hood 36 is provided with an opening 40 through which solids are fed to the pyrolysis chamber by ram feeder 22 and an opening 42 through which decomposition gases are removed from the hood. To make certain that there is no collection of explosive gases within feed hood 36, igniter means comprising a plurality of pilot burners, two of which are shown at 44 and 46, extend through the outer periphery of feed hood 36 and operatively provide a pilot flame within the hood at all times.

With reference in greater detail to ram feeder 22, this component of the apparatus comprises an upstanding feed tube 48 to receive solids from conveyor 20 and storage silo 18, and a generally horizontally disposed chamber 50 within which reciprocates an elongated piston 52. The length of piston 52 and its movement are such that it alternately allows solids to fall from upstanding feed tube 22 into chamber 50 and forces the solids which have fallen into chamber 50 toward one end of chamber 50 which extends through opening 40 in feed hood 36. The length of the piston stroke relative to the length of chamber 50 is such that a compacted plug of solids, illustrated at 54, always remains within chamber 50 and prevents the uncontrolled admission of air to the pyrolysis chamber or the escape of decomposition gases from the pyrolysis chamber. The reciprocation of piston 52 can be effected by any conventional means, not illustrated.

The lower end of rotary tubular member 26 extends into a firing hood 56 which is a stationary member generally corresponding to feed hood 36. A gas seal 58, generally similar to seal 38, is provided to prevent the entry of unwanted air into pyrolysis chamber 24, and extending through hood 56 is a large burner 60 which is supplied with any suitable fuel, such as natural gas, through a conduit 62 and which is so disposed that an open flame 64 operatively produced by burner 60 is directed in an unrestricted, spaced relationship with solid materials being pyrolyzed in the pyrolysis chamber and such that hot combustion gases from the flame are brought into intimate contact with the solid material being processed in the pyrolysis chamber 24. In one embodiment, the open flame 64 may be directed away from the bed of solid material and toward the wall of the refractory material 28 at some point along the length of pyrolysis chamber 24. It will be seen, therefore, that the solid materials are operatively heated by direct radiation from the flame and by convection from the hot combustion gases generated by the flame 64.

Disposed within rotary tubular member 26 and extending in a generally radial direction from the internal surface thereof are a plurality of heat-conductive, protruding members 66 which may be formed from any suitable heatresistant and heat-conductive material such as a heatresistant stainless steel. Members 66 serve the dual functions of conveying heat to solid materials being processed within pyrolysis chamber 24 and of agitating the solid materials such that fresh surface is continually exposed to pyrolysis and the solid materials can be more readily heated by convection and radiation. It is an important advantage of the apparatus that members 66 perform these functions without lofting the solid materials to thereby result in the generation of large quantities of suspended small solid particles which have a tendency to become entrained in the off-gases and interfere with the operation of other components of the apparatus. It has been found that members 66 serve to break up or prevent the "frankfurter" which tends to form in devices of this type when solid waste is tumbled.

Members 66 may suitably be of a wide variety of shapes and sizes but preferably have a length or shape such that they protrude from the inner surface of tubular member 26 a distance equal to from about 1/10 to ⅓ the mean internal diameter of tubular member 26. The cross-sectional shape of members 66 can suitably be square, rectangular, circular, elliptical, oval, or any other suitable shape but the members preferably have their minimum dimension generally parallel to the longitudinal axis of tubular member 26 so that they can effect a knifing or separating action on solids within the chamber 24 which operates in conjunction with the rotary motion of chamber 24 to effect agitation without lofting.

Figure 2:
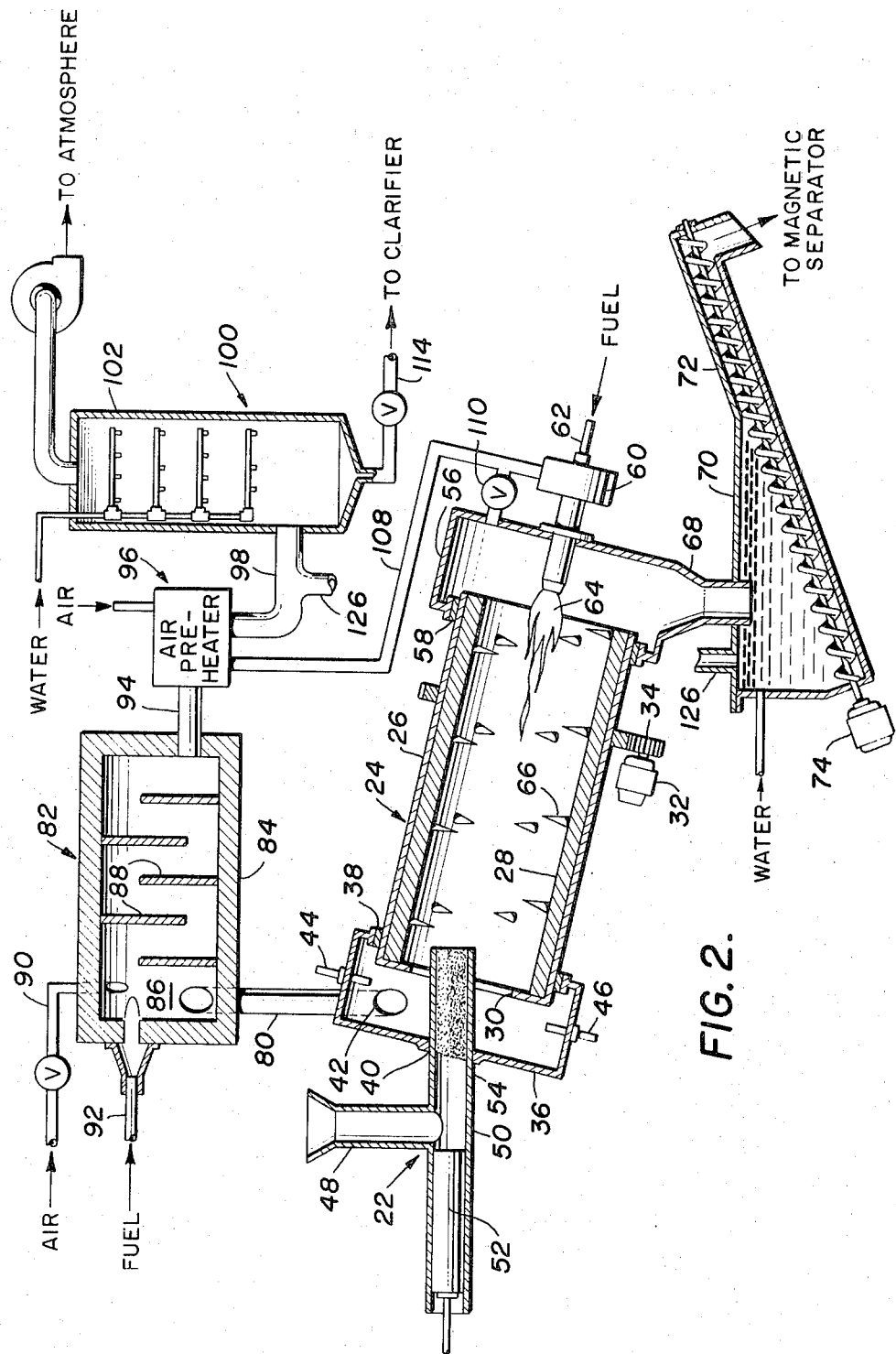
FIG. 2 is a largely schematic view partially in section of the pyrolysis chamber and several other apparatus components illustrated schematically in FIG. 1.
Figure 3:
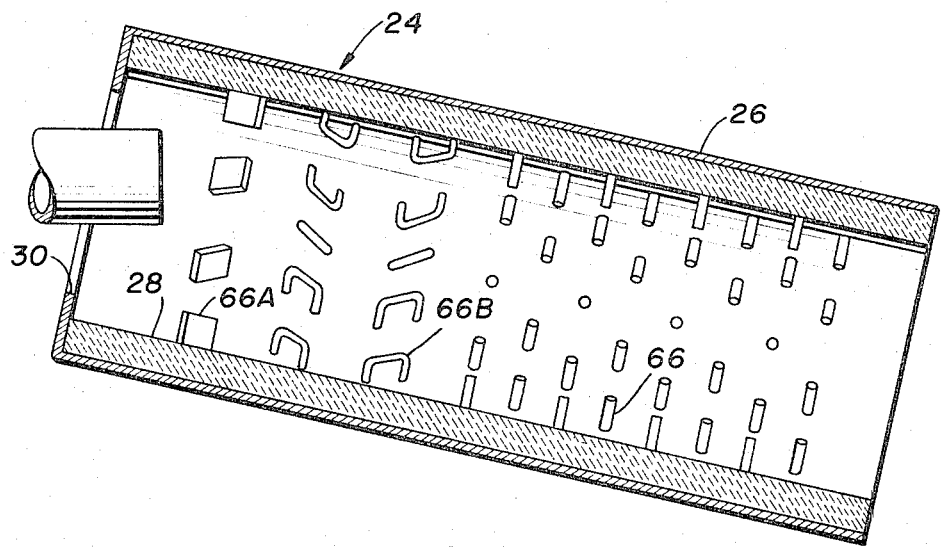
FIG. 3 is a schematic view in section of the pyrolysis chamber showing one embodiment of the arrangement and structures of the heat conductive protruding members.
Figure 4:
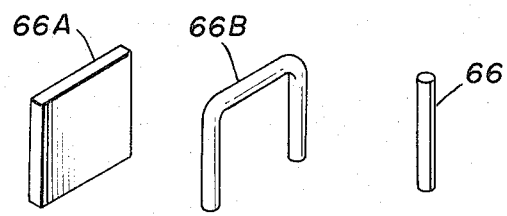
FIG. 4 shows some of the various forms the heat conductive protruding members may take.

In FIG. 2 members 66 are portrayed as spike-like members but may be cylindrical as shown in FIG. 4. Two other shapes are shown, 66A and 66B, in FIG. 4. Member 66A is blade shaped with a face disposed at an angle to the lateral axis of tubular member 26 so that they provide a propulsive action on solids in chamber 24. Member 66B is wicket-like and again is preferably disposed at an angle to the lateral axis of tubular member 26.

Depending from firing hood 56 is a delivery chute 68 for delivering a hot solid residue from pyrolysis chamber 24 to a quench basin 70. Quench basin 70 is operatively filled with an aqueous liquid such as water to a level slightly above the lower end of chute 68 to thereby provide a liquid seal which prevents air from entering delivery chute 68 from which it would otherwise enter pyrolysis chamber 24. It also serves to prevent at least a large part of the steam generated by contact of the hot residue with the aqueous liquid from passing into pyrolysis chamber 24. Quench basin 70 is operatively associated with a conveyor 72 which may suitably be, for example, a screw conveyor or a drag conveyor and which is driven by a suitable motor illustrated at 74. The shape of quench basin 70 in relation to the inclination to the horizontal of conveyor 72 is such that both the solids that float on the surface of the aqueous liquid in basin 70 and the solids which sink to the bottom of basin 70 are removed from the basin while allowing liquid to drain from the collected solids and to return along the bottom of the conveyor housing to basin 70.

From conveyor 72, the residual solids from the pyrolysis chamber are passed to a magnetic separator 76 which can be of conventional design and which serves the purpose of removing for salvage magnetic metals from the solid residue. The magnetic metals recovered by separator 76 are washed in a conventional design washer 78 to remove the remaining traces of non-magnetic pyrolysis residue. The non-magnetic residue from separator 76 is either sold for end use applications where its various components can be utilized (as is or after recovery) or else is trucked to a suitable disposal area. Useful components of the non-magnetic residue include carbonaceous material, glassy aggregate, various non-ferrous metals, etc.

The mixture of combustion gases and gaseous decomposition products generated within pyrolysis chamber 24 pass from the chamber through opening 42 in feed hood 36 and are conveyed by a conduit 80 to a flame purifier generally indicated by the reference numeral 82. Removal of these gases from the pyrolysis chamber 24 is effected by exhaust means 106 which is shown in FIG. 2 as placed immediately prior to discharge of the purified gases to the atmosphere. Any exhaust means placed anywhere down-stream (in respect to gas flow) of the pyrolysis chamber 24 can be used.

Flame purifier 82 comprises a generally cylindrical member 84 having an internal cavity 86 within which is disposed baffle means comprising a plurality of baffle members 88 which serve to increase the length of the gas flow path within cylindrical member 84 and to induce turbulance in the gas flow. Conduit means 90 are provided for introducing into flame purifier 82 a controlled amount of an oxygen containing gas such as air, and igniter means, illustrated as comprising a burner 92, is provided for producing a flame within flame purifier 82 at or near the point where air entering the purifier through conduit means 90 is mixed with the gases from pyrolysis chamber 24 entering the purifier through conduit 80. Both conduit means 90 and conduit 80 preferably provide tangential entry into cavity 86 to increase turbulence and promote rapid mixing of the air entering through conduit means 90 and the off-gases entering through conduit 80. Burner 92 not only serves to ignite the mixture of gases should its temperature fall below its auto-ignition temperature but can also serve to heat the gases to a proper temperature within flame purifier 82 if so required.

From air purifier 82 the gases operatively flow through a gas exit port into a conduit means 94 and to an air preheater generally indicated by the reference numeral 96 which is for the purpose of recovering sensible heat from the hot gases exiting flame purifier 82. Any suitable commercially available gas heat exchanger can be employed for air preheater 96.

From air preheater 96 the cooled gases are passed through a conduit 98 to a gas scrubber tower generally indicated by the reference numeral 100. Scrubber 100 can be of conventional design and is illustrated as comprising a plurality of water sprays 102 through which the gases from conduit 98 are passed in countercurrent flow. From scrubber 100 the off-gases are passed through a conduit 104 to an exhaust fan 106 through which they are discharged to the atmosphere.

The hot air produced by air preheater 96 can be employed for a number of purposes but at least part of the hot air is preferably ducted through a conduit 108 to burner 60 to provide preheated combustion air for the burner. Conduit 108 is also directly connected to the interior of firing hood 56 through a valve 110 so that if desired, controlled quantities of preheated air, in addition to that introduced into pyrolysis chamber 24 through burner 60, can be introduced by operation of valve 110. If desired, hot air from air preheater 96 can also be used to provide the air necessary for operation of burners 92, 44, and 46, or by means of a conduit 111 (See FIG. 1), a portion of the preheated air can be introduced into the gases leaving fan 106 to raise the temperature of the gases well above the dew point thereby avoiding the possible formation of a steam plume.

It is an advantage of apparatus in accordance with this invention that it can be so constructed as to avoid any discharge of liquids to the sewer thereby avoiding the usual problems with the discharge of hot liquids. To achieve this result, a clarifier generally indicated by the reference numeral 112, is provided for separating entrained solids from liquids by decantation and at least a portion of the water collected from sprays 102 in gas scrubber 100 is passed through a conduit 114 to clarifier 112 where solids are removed. Water relatively low in suspended solids from clarifier 112 is then added by means of a conduit 115 to water in a conduit 116 being circulated through gas scrubber 100. If necessary, make-up water sufficient to maintain a satisfactory liquid level in clarifier 112, can be introduced to the system through gas scrubber 100 by means of a conduit 118. Clarifier 112 can also serve to receive waste liquids from washer 78.

It has been found that the water in quench basin 70 tends to become somewhat basic and in accordance with one embodiment of the invention, a bleed line 122 is provided between quench basin 70 and clarifier 112 so that the basisity of liquid in the quench basin can be maintained at a relatively low level if desired. This may be desirable in many instances, not only to control the characteristics of the solid residue but also to raise the pH of the water being circulated through gas scrubbr 100 which tends to become acidic because of the presence in the pyrolysis off-gases of acids and acid anhydrids generated during pyrolysis. Solids from clarifier 112 are transported as an aqueous slurry to quencher 70 through a conduit 124. In fact, the sole supply of liquid to quench basin 70 can be by means of conduit 124 because the slurry concentration is of little or no importance as long as the solids content of the slurry does not rise above the point, usually about 85 percent, where handling of the slurry becomes difficult, and one can simply adjust the liquid flow through conduit 124 to maintain the proper level in quench basin 70 whether or not bleed line 122 is in operation. There is, of course, considerable loss of liquid from quench basin 70 because steam is generated as the hot solids residue from pyrolysis chamber 24 enters the basin and because the quenched residue is removed wet from the basin. To avoid release to the atmosphere of steam generated in quench basin 70, a conduit 126 is provided for transporting the steam to gas scrubber 100 where it is condensed and the resulting mist droplets removed.

In operation, solid heat-decomposable material, shredded as previously described to a suitable particle size, is fed in a relatively continuous manner to the upstanding feed tube 48 of ram reeder 22 and is forced into pyrolysis chamber 24 by reciprocation of piston 52. The most advantageous rate of feed in terms of pounds per hour depends upon a number of variables, the most important of which is the size of the pyrolysis chamber and primarily its cross-sectional area. Although there is no minimum rate at which material can be fed to a pyrolysis chamber of any size except a limit which may be dictated by economics, there is a maximum practical feed rate in that the rate of feed should not be so high as to result in any cross-sectional segment of the pyrolysis chamber being more than 50 percent filled with solids being processed and preferably at no point along its length should the tubular member 26 be more than about 25 percent filled with waste solids.

Within the limits of the equipment, the rate of feed should be correlated with the BTU input from burner 60 and with the amount of air introduced into the pyrolysis chamber, if any, in excess of that required for the proper combustion of the fuel fed to burner 60, to provide for the material fed to the pyrolysis chamber being heated to the temperature necessary to achieve the desired degree of pyrolysis and to result in the off-gases from the pyrolysis chamber being at the most advantageous temperature. When used for the treatment of solid municipal wastes, the process variables should be correlated such that the solid residue from pyrolysis at no time reaches a temperature above 2200°F because if the temperature is allowed to go above this value, it results in the formation of excessive quantities of slag within the pyrolysis chamber. Generally, the temperature of the residue should not be allowed to go above 2000°F as a safety factor with the preferred temperature range for waste treatment being from 1500°F to 1900°F. This is not to say, however, that such high temperatures are required to achieve any degree of pyrolysis and, in fact, the pyrolysis chamber can be operated such that the wastes achieve a maximum temperature of not more than 500°F to 600°F and even at these relatively low temperatures, substantial pyrolysis is obtained.

Although of less importance than the temperature of the materials being pyrolyzed in the pyrolysis chamber, the temperature of the off-gases exiting the pyrolysis chamber is also an important consideration and process variables if possible should be correlated to provide an off-gas temperature of at least about 500°F and preferably of at least about 600°F to avoid excessive condensation of liquefiable components prior to the time that the off-gases reach flame purifier 82. If conditions permit, it is even more desirable to retain the exit temperature of the off-gases as they leave the pyrolysis chamber above their auto-ignition temperature to eliminate any explosion hazard and additionally reduce the need for pilot burners 44 and 46. Except, however, as may be dictated by these considerations; there is no lower temperature limit for the off-gases except that dictated by practicality, and with pilot burners 44 and 46 in operation and with provision for collecting condensed liquids, the unit can be operated with the off-gases at any temperature from the lowest it is possible to obtain with any degree of pyrolysis to the maximum it is possible to obtain without over-heating the materials being pyrolyzed.

The most advantageous retention time of the material to be pyrolyzed within the pyrolysis chamber will vary depending upon the nature of the feed, the rate of feed, and other factors but is of no great importance as long as the solid residue as it departs from the pyrolysis chamber is at a proper temperature within the ranges set forth above. Similarly, the extent to which the pyrolysis chamber is filled with material being pyrolyzed is of little importance as long as effective heat transfer is achieved, excessive solids entrainment in the off-gases is avoided, and the solid residue and gaseous products leaving the pyrolysis chamber are at temperatures within acceptable ranges.

As has been previously mentioned, it is permissible to admit air to the pyrolysis chamber in addition to that required to support combustion of the fuel fed to burner 60 and the admission of such excess oxygen to the pyrolysis chamber results in burning of part of the pyrolysis decomposition gases in situ. This is sometimes advantageous to reduce the number of BTU's that must be provided by burner 60 and/or to increase the temperature of the gases leaving the pyrolysis chamber. It has the disadvantage, however, that it increases the gas flow through and from the pyrolysis chamber and this tends to increase entrainment of solid particles in the gas stream from the chamber. If, however, the amount of excess oxygen introduced into the chamber is no more than is required to oxidize from about 50 percent to 60 percent of the pyrolysis gases generated within the chamber, satisfactory results can be obtained in most instances and excellent results are generally obtainable when introducing enough excess air to oxidize only from about 5 percent to 40 percent of such gases, particularly if the air is preheated such that it does not reduce the temperature of the pyrolysis chamber to an objectionable extent. It will be understood that pyrolysis differs from incineration in that pyrolysis is an endothermic reaction requiring a substantial heat input whereas incineration normally results in the generation of heat, and because of this difference, the introduction of cold air into the pyrolysis chamber is not advantageous as it sometimes is in an incineration process.

One function of flame purifier 82 is to insure that no combustible gases are released to the atmosphere and in view of this it will be apparent that at least sufficient air should be fed through conduit 90 to insure the complete burning of all combustible gases received by the flame purifier through conduit 80 from pyrolysis chamber 24. In actual practice it is advantageous to use an excess of air, for example, from 10 percent to 150 percent excess over that required to burn all combustible gases received by the flame purifier since this avoids the necessity of precisely monitoring the gas flows to make certain that a stoichiometric equivalent of oxygen is present at all times. In many instances the use of excess air is advantageous for the additional reason that it insures temperatures in the flame purifier below the temperature at which damage to the interior lining of the flame purifier results. If desired, even a larger excess of air can be employed and, for example, in most instances a 200 percent to 400 percent excess can be employed with satisfactory results although the use of such a large excess is normally not advantageous for the reason that it unduly increases the volume of gases which must be processed and may require a substantial heat input into the flame purifier from burner 92, particularly if the gases from pyrolysis chamber 24 are diluted to the extent that the resulting mixture will not support combustion.

To insure that the gases released to the atmosphere are odor-free, it is necessary to achieve a temperature of at least about 1200°F to 1400°F in the flame purifier and the temperature within the flame purifier is preferably within the range of about 1500°F to 2500°F. There is no upper limit as to the temperature that can be satisfactorily employed in flame purifier 82 except that dictated by practicality. The use of lining material in flame purifier 82 that will stand temperatures above 2800°F to 3000°F is needlessly expensive, and even if such lining is used, it is difficult to achieve temperatures above about 3200°F to 3500°F using hydrocarbon gases as fuel. For these reasons, such temperatures constitute practical upper limits.

In normal operation a satisfactory operating temperature can be reached in flame purifier 82 solely as a result of the exothermic combustion of the off-gases from pyrolysis chamber 24 so that burner 92 serves merely as a pilot and no heat input from burner 92 is required for satisfactory operation. If, however, a large excess of cold air is introduced to flame purifier 82 through conduit 90 or if the off-gases from the pyrolysis chamber entering flame purifier 82 through conduit 80 are deficient in combustible components, it is necessary that burner 92 be operated in such a manner as to provide an operating temperature of at least about 1200°F to 1400°F in the flame purifier.

It is believed that the mode of operation of the remaining components of the apparatus has been made clear from the description of the apparatus components themselves or else will be readily apparent to those skilled in the art. As previously mentioned, a number of the apparatus components are items of standard equipment available commercially from several different sources and the mode of operation of such apparatus components is well known to those skilled in the art.

While the invention has been described specifically with reference to the treatment of a solid pyrolyzable material, it will be understood that any heat-decomposable non-gaseous material can be processed. For example, liquid wastes or flowable mixtures of liquid and solid wastes can be readily treated using the process and apparatus of this invention and, in fact, the processing of flowable materials is simpler than the processing of solid materials since there is no need for shredding apparatus or special solids handling equipment and one can simply pump the liquid material or slurry of liquid and solid materials directly into the upper end of rotary tubular member 26. Except for this difference in mode of feeding the equipment, operation can be the same for the processing of a liquid waste or slurry as has been described for the processing of solid materials.

What is claimed is:

1. A method for treating shredded solid municipal waste comprised of solid heat-decomposable material and which tends to form an entangled mass upon rotary tumbling, within an inclined rotary tubular chamber by the pyrolytic decomposition thereof to form a hot solid residue and gaseous pyrolytic decomposition products, which method comprises:

a. feeding said material into said rotary tubular chamber proximate a first end thereof, said first end being elevated with respect to the opposite end thereof;

b. heating the resulting bed of said material within said rotary tubular chamber to a temperature sufficient to result in at least partial pyrolytic decomposition of said material into gaseous pyrolytic decomposition products and a hot solid residue, said bed of said material being maintained in a substantially nonoxidizing atmosphere as said material is being pyrolyzed; said heating of said material resulting in part from an open flame from a burner located proximate said opposite end of said rotary tubular chamber such that said open flame is disposed within said rotary tubular chamber in an unrestricted, spaced relationship with said material so that said material is heated by direct radiation from said open flame, and the remainder of said heating of said material resulting from the oxidation of said gaseous pyrolytic decomposition products in step (c);

c. concurrently admitting oxygen into said rotary tubular chamber proximate said opposite end thereof in an amount sufficient to result in the oxidation of at least part but not more than 60 percent of said gaseous pyrolytic decomposition products, said oxygen mixing with said gaseous pyrolytic decomposition products and resulting in at least partial combustion thereof, based upon the oxygen present, within said rotary tubular chamber, said substantially non-oxidizing atmosphere referred to in step (b) being substantially maintained between said bed of material and said combusting gaseous pyrolytic decomposition products, d. concurrently agitating said bed of material within said rotary tubular chamber by the rotary motion thereof coupled with a mechanical hot knifing and separating action applied to said bed of material in a manner which minimizes entrainment of said material in the moving stream of gases, e. continuously withdrawing the resulting gaseous mixture of said gaseous pyrolytic decomposition products and the partial combustion products thereof from said rotary tubular chamber proximate said first end thereof, and f. discharging said hot solid residue from said rotary tubular chamber proximate said opposite end thereof.

2. A method according to claim 1 wherein said resulting gaseous mixture is continuously charged into a combustion chamber together with further oxygen in an amount such as to provide at least the theoretical quantity of oxygen necessary for complete oxidation of the remaining uncombusted gaseous pyrolytic decomposition products in said gaseous mixture.

3. A method according to claim 2 wherein the total gaseous mixture within said combustion chamber is at a temperature above the auto-ignition temperature thereof.

4. A method according to claim 2 wherein the total gaseous mixture within said combustion chamber is ignited with a burner in the event the temperature of said total gaseous mixture falls below the auto-ignition temperature thereof.

5. A method for treating shredded solid municipal waste comprised of solid heat decomposable material and which tends to form an entangled mass upon rotary tumbling, within an inclined rotary tubular chamber by the pyrolytic decomposition thereof to form a solid residue and environmentally acceptable off-gases, which method comprises:

a. feeding said material into said rotary tubular chamber proximate a first end thereof, said first end being elevated with respect to the opposite end thereof;

b. heating the resulting bed of said material within said rotary tubular chamber to a temperature sufficient to result in at least partial pyrolytic decomposition of said material into gaseous pyrolytic decomposition products and a hot solid residue, the bed of said material being maintained in a substantially non-oxidizing atmosphere as said material is being pyrolyzed; said heating of said material resulting in part from an open flame from a burner located proximate said opposite end of said rotary tubular chamber such that said open flame is disposed within said rotary tubular chamber in an unrestricted, spaced relationship with said material so that said material is heated by direct radiation from said open flame, and the remainder of said heating of said material resulting from the oxidation of said gaseous pyrolytic decomposition products in step (c);

c. concurrently admitting oxygen into said rotary tubular chamber proximate said opposite end thereof in an amount sufficient to result in the oxidation of at least part but not more than 60 percent of said gaseous pyrolytic decomposition products, said oxygen mixing with said gaseous pyrolytic decomposition products and resulting in at least partial combustion thereof, based upon the oxygen present, within said rotary tubular chamber, said substantially non-oxidizing atmosphere referred to in step (b) being substantially maintained between said bed of material and said combusting gaseous pyrolytic decomposition products;

d. concurrently agitating said bed of material within said rotary tubular chamber by the rotary motion thereof coupled with a mechanical hot knifing and separating action applied to said bed of material in a manner which minimizes entrainment of said material in the moving stream of gases;

e. continuously withdrawing the resulting gaseous mixture of said gaseous pyrolytic decomposition products and the partial combustion products thereof from said rotary tubular chamber proximate said first end thereof;

f. discharging said hot solid residue from said rotary tubular chamber proximate said opposite end thereof;

g. continuously charging said resulting gaseous mixture withdrawn from step (e) into a combustion chamber together with further oxygen and oxidizing the remaining uncombusted gaseous pyrolytic decomposition products contained in said resulting gaseous mixture, and h. subjecting the gases leaving said combustion chamber to an aqueous scrubbing prior to discharging said gases to the atmosphere.

6. A method according to claim 5 wherein liquid from said aqueous scrubbing is at least partially separated from entrained solid particulate matter, and said liquid is recycled to said aqueous scrubbing.

7. A method as in claim 5 wherein said hot solid residue is quenched in an aqueous bath.

8. A method as in claim 6 wherein (a) said hot solid residue is quenched in an aqueous bath (b) the aqueous phase from said aqueous scrubbing is at least partially separated from solid particulate matter contained therein in a clarifier, (c) the relatively particulate-free liquid from said clarifier is recycled to said aqueous scrubber, and (d) the particulate containing aqueous slurry from said clarifier is recycled to said aqueous quench bath.

* * * * *